United States Patent [19]

Lee et al.

[11] Patent Number: 4,888,988

[45] Date of Patent: Dec. 26, 1989

[54] SILICON BASED MASS AIRFLOW SENSOR AND ITS FABRICATION METHOD

[75] Inventors: Ki W. Lee, Williamsburg; Il-Hyun Choi, Newport News, both of Va.

[73] Assignee: Siemens-Bendix Automotive Electronics L.P., Troy, Mich.

[21] Appl. No.: 137,299

[22] Filed: Dec. 23, 1987

[51] Int. Cl.$^4$ ............................................. G01F 1/68
[52] U.S. Cl. ................................................. 73/204.26
[58] Field of Search .......................... 73/204, 204.26

[56] References Cited

U.S. PATENT DOCUMENTS

| | | |
|---|---|---|
| 3,767,494 | 10/1973 | Muraoka et al. . |
| 4,091,169 | 5/1978 | Bohg et al. . |
| 4,227,975 | 10/1980 | Hartman et al. . |
| 4,239,599 | 12/1980 | Ito . |
| 4,256,532 | 3/1981 | Magdo et al. . |
| 4,320,655 | 3/1982 | Kammermaier et al. ............. 73/204 |
| 4,348,546 | 9/1982 | Little . |
| 4,372,803 | 2/1983 | Gigante . |
| 4,420,872 | 12/1983 | de Zaldivar . |
| 4,471,647 | 9/1984 | Jerman et al. ........................ 338/25 |
| 4,472,239 | 9/1984 | Johnson et al. . |
| 4,478,076 | 10/1984 | Bohrer . |
| 4,478,077 | 10/1984 | Bohrer et al. . |
| 4,501,144 | 2/1985 | Higashi et al. . |
| 4,542,650 | 9/1985 | Renken et al. . |
| 4,548,078 | 10/1985 | Bohrer et al. . |
| 4,581,928 | 4/1986 | Johnson ........................... 73/204.26 |
| 4,594,889 | 7/1986 | McCarthy . |
| 4,614,119 | 9/1986 | Zavracky et al. . |
| 4,624,137 | 11/1986 | Johnson et al. . |
| 4,624,138 | 11/1986 | Ono et al. . |
| 4,633,578 | 1/1987 | Aine et al. ............................ 73/204 |
| 4,651,564 | 3/1987 | Johnson et al. . |
| 4,672,354 | 6/1987 | Kurtz et al. . |
| 4,680,963 | 7/1987 | Tabata et al. . |
| 4,682,503 | 7/1987 | Higashi et al. . |
| 4,683,159 | 7/1987 | Bohrer et al. . |
| 4,685,331 | 8/1987 | Renken et al. . |

FOREIGN PATENT DOCUMENTS

| | | | |
|---|---|---|---|
| 0147831 | 7/1985 | European Pat. Off. .............. | 73/204 |
| 59-65216 | 4/1984 | Japan . | |

OTHER PUBLICATIONS

SAE Technical Paper, "Silicon Micromachining Technology For Automotive Applications", K. W. Lee and B. E. Walker.

*Primary Examiner*—Herbert Goldstein
*Attorney, Agent, or Firm*—Russel C. Wells; George L. Boller

[57] ABSTRACT

A mass airflow sensor is fabricated on a semiconductor substrate and which includes (1) a dielectric diaphragm, (2) p-etch-stopped silicon rim, (3) thin-film heating and temperature sensing elements, and (4) tapered chip edges. The dielectric diaphragm is formed with thin silicon oxide and silicon nitride in a sandwich structure and provides excellent thermal insulation for the sensing and heating elements of the sensor. The diaphragm dimensions, including thickness, are accurately controlled through the use of the heavily-p-doped silicon rim to help ensure uniform and reproducible sensor performance.

43 Claims, 3 Drawing Sheets

SILICON BASED MASS AIRFLOW SENSOR AND ITS FABRICATION METHOD

CROSS REFERENCE TO RELATED APPLICATIONS

This application is related to the application by Ki Won Lee entitled "Silicon Based Sensors and Method of Making Same", Ser. No. 07/132,219, filed Dec. 23, 1987; the application of John S. Bergstrom entitled "Planar Mounting of Silicon Sensors for Pressure and Airflow Measurement", Ser. No. 07/195,733, filed May 16, 1988 and the application of Lee et al. entitled "Control and Detection Circuitry for Mass Flow Sensors", Ser. No. 07/137,220, filed Dec. 23, 1988.

FIELD OF THE INVENTION

This invention relates to mass airflow sensors and a method of fabricating such sensors. More particularly the invention relates to a silicon-based mass airflow sensor which has a high flow sensitivity, long term stability and reliability, and a fast response speed compatible with industrial and automobile microprocessor-based real time control systems.

BACKGROUND AND SUMMARY OF THE INVENTION

The automotive industry in recent years has recognized the advantages of using electronic fuel management systems to improve vehicle performance over mechanically based fuel control systems. It has been predicted in view of the success of such electronic fuel management systems that in the not too distance future all major automobile manufacturers will turn to electronic control systems for monitoring and controlling the major automobile subsystems.

To increase fuel efficiency and to meet tighter emission requirements such next generation electronic control systems will need more advanced and sophisticated sensors that can be cost effectively manufactured. The microprocessor, which is the heart of such an electronic control system, is capable of executing instructions on the order of magnitude of a one million per second. A need has therefore arisen for mechanically rugged and reliable sensors which have an extremely fast response time. Prior to the present invention, such sensors have been performance limiting factors which have caused delay in the development and implementation of cost effective, integrated vehicle control systems.

In electronic fuel management control systems to provide the required fuel-to-air ratio, it is necessary for the control system to be fed mass airflow rate data. With such data, the controlling microprocessor calculates the amount of fuel needed under the then existing operating conditions to generate a fuel injection control signal.

Prior art mass airflow sensors typically are of the thin-wire or thin-film type. The thin-wire type of sensor is fabricated with a fine resistive wire such as platinum or tungsten wound on a ceramic bobbin. In operation, a predetermined current flows through the wire to heat the resistive wire to a preset temperature. Any airflow alters the rate of heat transfer from the heated wire, thereby causing a wire temperature change (and an attendant change in resistance). Readout circuitry converts this temperature/resistance change into current or voltage changes from which airflow rate may be determined in a manner well known to those skilled in the art.

The thin-wire type of sensor shows critical limitations in electronic fuel management control applications. In this regard, due to the sensor's significant thermal mass, its speed of response is too slow for effective microprocessor-based real time flow control. Also, the use of such thin-wire type sensors renders the overall sensor more bulky than desired. Additionally, the process of fabricating such sensors involves cost inefficient and performance degrading steps. Finally, it is noted that under some noisy environments, the thin-wire type of sensor transmits noise to the external circuit to thereby limit the sensor's flow resolution and accuracy.

An exemplary prior art thin-film type of sensor is the Honeywell microswitch and mass airflow sensor. This sensor includes a "bridge" on the front side of the device which is fabricated by undercutting the wafer substrate from the front side of the wafer.

This "bridge" type of thin-film sensor has a number of disadvantages. The sensor is very sensitive to the direction of airflow over the bridge and the manner in which the sensor device is mounted. Accordingly, it is difficult to achieve precisely reproducible results from sensor to sensor rendering the sensor difficult to calibrate. Furthermore, the bridge structure is not as structurally strong or as rugged as the sensor of the present invention. Additionally, the "bridge" thin-film sensor includes an air channel which is built into the silicon wafer. This tiny air channel (which is required due to the design of the "bridge" type sensor) limits the dynamic range of the sensor such that very high airflow rates cannot be accurately detected.

The present invention is a silicon-based mass airflow sensor which has a high flow sensitivity, high speed of response and sufficient mechanical ruggedness and reliability to be fully compatible with automobile and other industrial fluid flow control systems (e.g., where sensed gas flow rate is used to control gas flow). The mass airflow sensor of the present invention is fabricated using silicon micromachining and integrated circuit techniques which allow the sensor to be reliable, compact and cost-effectively manufactured.

The present invention is a thin-film type of sensor having significant advantages over prior art sensors of the type discussed above. The present invention uses a small, thin dielectric diaphragm providing good thermal isolation for thin-film heating and temperature sensing elements, resulting in high flow sensitivity and low current operation of the heating element. The dielectric diaphragm is bounded by a p-etch-stopped silicon rim. The thermal mass of the diaphragm is so low that the speed of the sensor response to airflow change is much faster than prior art sensor response times. As discussed above, such a fast response time is critically important to real time microprocessor-based airflow control.

In contrast to the "bridge" type sensors, the present invention has a wide dynamic range of airflow which can be accurately detected (in part because it does not require such a small airflow channel). Additionally, the present invention is not nearly as sensitive to airflow direction as the Honeywell sensor.

In the present invention, silicon micromachining techniques are utilized to provide sensor microstructure which is precisely determined. Such micromachining techniques allow the sensor to be made very small while achieving uniform sensor-to-sensor performance.

Silicon micromachining is a process technique which enables precise three dimensional shapes to be formed in silicon. In this regard, control of dimensions may be practically effected from a few microns to a few millimeters with tolerances of less than one micron. The silicon micromachining techniques utilized to fabricate the present invention combines standard semiconductor processes with a variety of etching techniques to batch fabricate sensors that have sensing elements and interface circuitry on the same chip.

Silicon micromachining techniques which may be utilized in fabricating the present invention are described in further detail in above-mentioned co-pending application Ser. No. by Lee entitled "Silicon Based Sensors and Method of Making Same," which application is hereby incorporated by reference herein. Since the fabrication method taught herein is compatible with conventional IC technology the sensor and its readout circuit may be fabricated on a single silicon chip which makes the sensor more reliable, noise-immune and compact.

The present exemplary embodiment is fabricated to incorporate the following important sensor features: (1) a dielectric diaphragm, (2) a p-etch-stopped silicon rim, (3) thin-film resistors, and (4) tapered chip edges. The dielectric diaphragm is formed with thin silicon oxide and silicon nitride in a sandwich structure that provides excellent thermal insulation for the sensor's temperature sensing and heating elements. The diaphragm dimensions including thickness are accurately controlled (to help ensure uniform and reproducible sensor performance) through the use of a heavily-p-doped thin silicon rim. The silicon rim reduces the performance sensitivity to front-backside photolithographic misalignment and wafer thickness variations.

BRIEF DESCRIPTION OF THE DRAWINGS

These as well as other features of this invention will be better appreciated by reading the following detailed description of the presently preferred embodiment taken in conjunction with accompanying drawings of which.

DETAILED DESCRIPTION OF THE DRAWINGS

Figure 1:
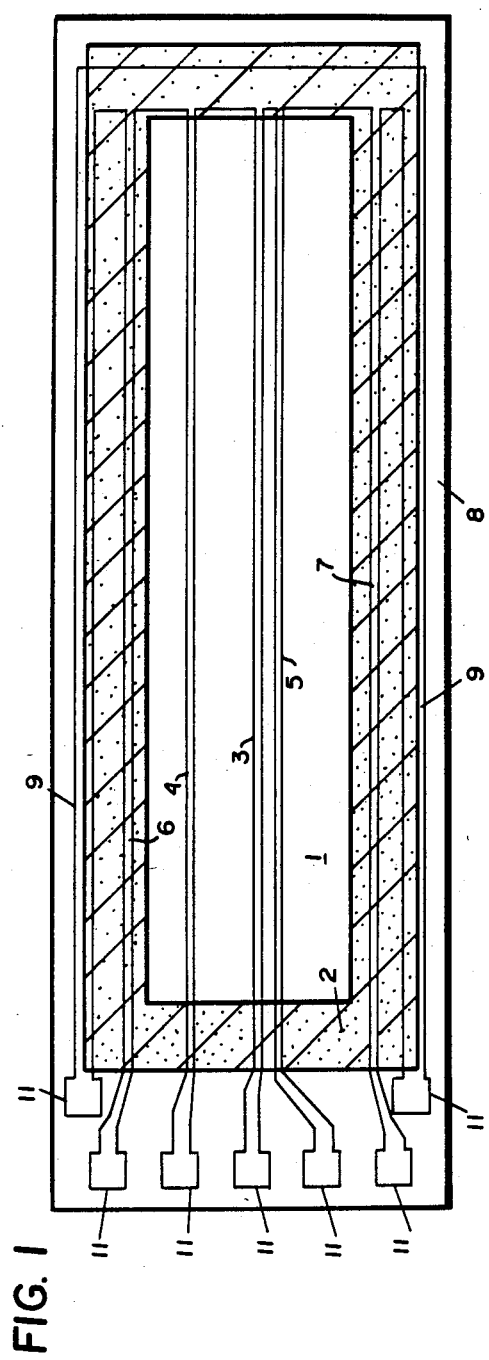
FIG. 1 is a plan view of a mass airflow sensor in accordance with an exemplary embodiment of the present invention.

Turning to FIG. 1, a mass airflow sensor in accordance with an exemplary embodiment of the present invention is shown. The sensor, which may be, for example, 2 mm wide by 4–7 mm long, includes a thin diaphragm window 1 comprised of a sandwich structure of silicon dioxide and silicon nitride. The sandwich structure, which extends the length of the sensor, advantageously provides thermal stress relief, mechanical ruggedness and structural integrity.

This thin dielectric diaphragm structure provides good electric insulation and the necessary thermal isolation of the heating element 3 and the ambient air temperature sensing elements 6 and 7 which are described further below. Such thermal isolation provides the sensor with a high flow sensitivity and allows for low current operation of the heating element 3. As noted above, the thermal mass of the diaphragm structure is so low that the speed of the sensor in responding to airflow change is very fast and compatible with the needs of a real time microprocessor-based fuel management control system.

The diaphragm window 1 is surrounded by a heavily-p-doped silicon rim 2 which is embedded in a silicon substrate 8. As will be explained further below, the heavily-p-doped silicon rim 2 allows the diaphragm window 1 to be shaped as desired and permits the diaphragm dimensions to be accurately controlled regardless of the thickness variations of the silicon substrate. The silicon rim 2 further serves to reduce the performance sensitivity of the sensor to front-backside photolithographic misalignment.

Metal thin-film elements 3, 4, 5, 6, 7 and 9 are formed on top of the sensor surface with the metal lines 3, 4, and 5 being disposed directly on top of the dielectric diaphragm. As shown in FIG. 1, thin-film element 3 is substantially disposed along the longitudinal axis of the sensor. The metal thin-film lines may, for example, be gold and chromium based and are on the order of a micron thick. The chromium layer is used as an adhesive between the silicon oxide of the diaphragm structure and the gold. Each thin-film line has an associated bonding pad 11. Additionally, the metal lines are covered with a plasma deposited silicon nitride film for passivation.

Functionally, the metal pattern 3 on the diaphragm serves as a heating element and the metal patterns 4 and 5 serve as upstream and downstream temperature sensing elements, respectively. Metal pattern 4 is referred to as an upstream sensing element relative to sensing element 5 because the sensor is typically disposed such that air flows from the top of the sensor to the bottom. Thus, the airflow strikes element 4 before element 5. The metal patterns 6 and 7 serve as temperature-sensing elements which are used to determine the non-heated or ambient air temperature. Metal pattern 9, which may be disposed wholly over the silicon rim 2 or the substrate 8 or as shown, serves as a common ground to which all the thin-film elements are connected. The common ground 9 typically carries more current than the other thin-film elements 3–7 and is wider than such elements so that it does not heat up to an undesired degree.

A gold-based metal system is used for the heating and temperature sensing elements since gold provides good resistance against environmental corrosion and process etching chemicals (which simplifies the fabrication process and improves fabrication yield). Additional metals such as chromium, molybdenum, or titanium are preferably used to provide the necessary good adhesion between the gold layer and the silicon oxide layer. This metal system provides such good ohmic contact to silicon and has such a low resistivity that it can be used as an interconnection system for an on-chip sensor readout circuit, as will be described further below.

Figure 2:
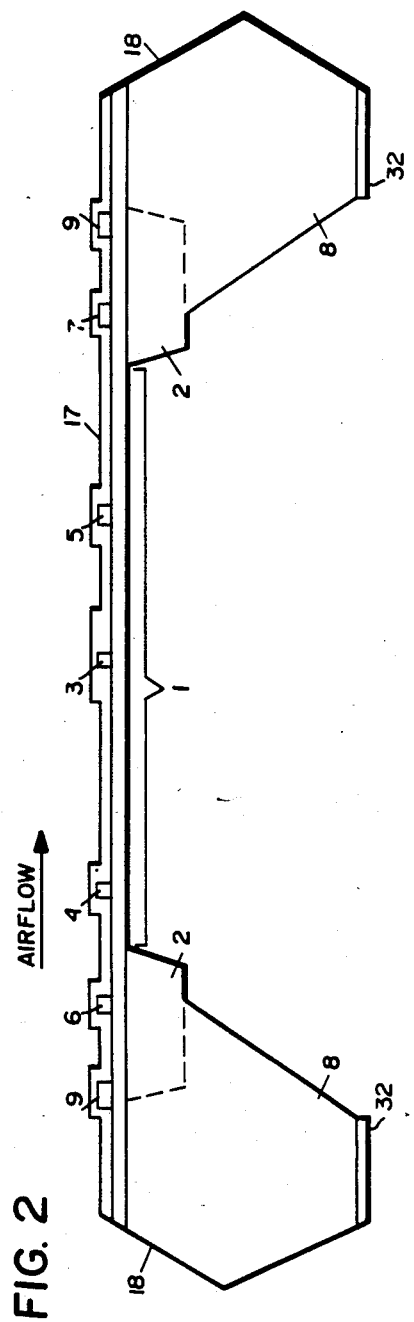
FIG. 2 is a simplified cross-sectional view of a mass airflow sensor in accordance with the exemplary embodiment of the invention shown in FIG. 1.

FIG. 2 is a simplified cross-sectional view of the mass airflow sensor shown in FIG. 1. The heavily p-doped silicon rim 2 is shown disposed below the uppermost sandwich structure 32 and sensing elements 6 and 7 at the interface of the (100)-oriented silicon substrate 8 and the thin dielectric diaphragm window 1. As noted above, the heavily-p-doped silicon rim 2 serves to accurately define the dielectric diaphragm window size while keeping the temperature sensing elements 6 and 7 at the ambient air temperature. In fabricating the sensor, the diaphragm window 1 is defined by etching from the backside of the silicon wafers. The heavily-p-doped silicon rim 2 is not etched by the chemical etching solution and thus precisely defines the diaphragm dimensions.

Also shown in FIG. 2 are the thin-film metal layers which are deposited on top of the diaphragm window 1 to form the thin-film heating resistor 3 and the temperature sensing resistors 4 and 5. The resistors 6 and 7 are placed on the highly thermally conductive silicon rim 2 of the silicon substrate 8 and are used to measure the non-heated or ambient air temperature. It is noted that depending upon the desired resistance for the temperature sensing and heating elements more than one thin-film element may be disposed in place of the single elements 3–7.

All the thin-film metal resistors are covered with a passivation layer 17. This passivation layer 17 precludes the thin-film metal resistors from being contaminated by ambient air (to prevent, for example, dust particles from accumulating on these elements) which might in time change the devices' response time. In this fashion, the sensor's long-term reliability is enhanced.

The sensor chip edges 18 as shown in FIG. 2 are tapered in order to minimize any undesirable effect arising from inserting the sensor into an air stream. In this regard, the disturbing effect of the air initially striking the chip edge is markedly reduced when compared with a side edge design which is perpendicular to the surfaces of the sensor. Below the tapered edges 18, the sensor is shown resting on masking material (e.g., lower sandwich structure 32).

In operation, the sensor shown in FIGS. 1 and 2 is disposed in the appropriate air channel of an electronic fuel management control system such that an airflow is present flowing from the top of the sensor to the bottom in FIG. 1 (and from left to right in FIG. 2). The readout circuitry initially generates a predetermined amount of current flow through heating element 3. This current flow sets the heating element temperature to a level such that there is a predetermined temperature difference between heating element 3 and the non-heated or ambient air temperature sensing element 6 (which temperature gradient is maintained constant through the sensor's operation).

When there is an airflow, the temperature of heating element 3 will necessarily drop. As the temperature of heating element 3 drops, the temperature of sensing elements 4 and 5 will also decrease. As the temperature of heating element 3 begins to drop, readout circuitry connected via the bonding pads 11 generates current to maintain element 3 at the same predetermined temperature and then determines the temperature of sensing element 4 to generate therefrom a signal which is indicative of airflow. As will be appreciated by those skilled in the art, the resistivity of the elements 3 through 7 change as a function of temperature. In this regard, as the temperature increases, the resisitivity of elements 3–7 will likewise increase. The readout circuitry associated with the airflow sensor of the present invention (which is shown as on chip readout circuit 20 in FIG. 4) may be of the type disclosed in co-pending application Ser. No. 07/137,220 by Lee et al. entitled "Control and Detection Circuitry for Mass Airflow Sensors," which is hereby expressly incorporated by reference herein.

In the Lee et al. application, a primary sensor circuit is disclosed which includes heating element 3, temperature sensing element 5 and ambient air temperature sensing element 6. A slave sensor circuit is disclosed which includes temperature sensing element 4 and ambient air temperature sensing element 7. The primary circuit, by maintaining a predetermined constant temperature gradient between the heating element 3 (which is substantially the same temperature as sensing element 5) and the ambient air temperature sensing element 6, keeps element 3 at a fixed temperature ($T_{FIXED}$) above the ambient air temperature ($T_{AMBIENT}$), i.e., Temp 3 $=T_{FIXED}+T_{AMBIENT}$. At the same time, the primary circuit functions to keep the slave temperature sensing element 4 at a fixed temperature offset (related to $T_{FIXED}$) above the ambient air temperature reduced by a temperature change due directly to airflow ($T_{FLOW}$), i.e., Temp 4 $=T_{AMBIENT}+T_{FIXED\ OFFSET}-T_{FLOW}$.

The voltage across element 4 (which is proportional to the temperature of element 4) is applied to the inverting input of a slave circuit operational amplifier, whose non-inverting input varies as a function of ambient air temperature. With a signal indicative of ambient air temperature being input to both the inverting and non-inverting inputs of the operational amplifier, the effect of ambient air temperature is canceled. The output voltage of the slave circuit is a signal which is indicative primarily only of airflow.

A microprocessor associated with the electronic fuel management control system determines the airflow based on the sensor output voltage. Based on the airflow, the microprocessor determines the amount of fuel required to get a desired fuel-to-air ratio, for example, by utilizing well known table look-up techniques. Upon determining the amount of fuel required, the microprocessor sends a corresponding signal to the fuel injector which provides the precise amount of fuel required.

Figure 3A:
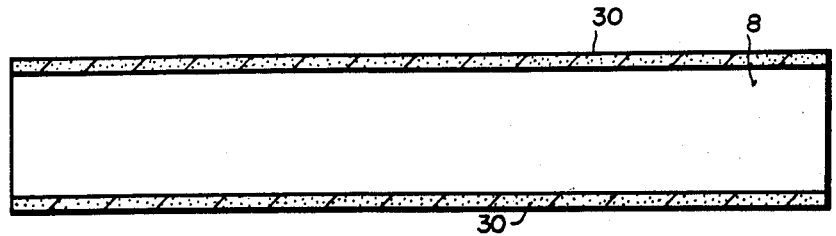
FIGS. 3a through 3f generally depict a fabrication process for a mass airflow sensor of the type shown in FIG. 1.
Figure 3B:
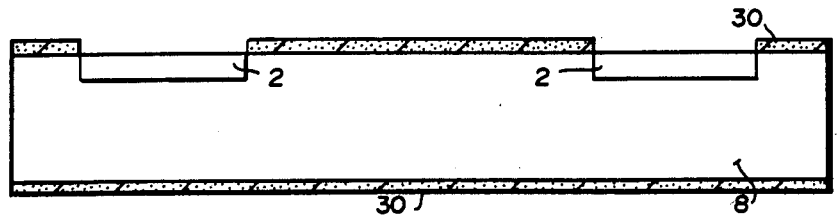

The method of processing a silicon wafer to fabricate the mass airflow sensor of the present invention is shown in FIGS. 3a through 3f (which are not drawn to scale). In FIG. 3a, a relatively thick silicon oxide layer 30 is first grown on both sides of a (100)-oriented silicon wafer 8. In FIG. 3b, access to the silicon rim region 2 is opened through layer 30, utilizing well-known photolithography techniques and the substrate 8 is heavily and deeply doped with boron to form the p-etched stop silicon rim around the diaphragm window as shown in FIG. 1. Thus, in FIG. 3b, all the areas of the silicon dioxide 30 are masked except for the area over where the p-etch stop silicon rim 2 is be formed. After the opening is created, the doping of the silicon rim 2 is accomplished by boron diffusion.

Figure 3C:
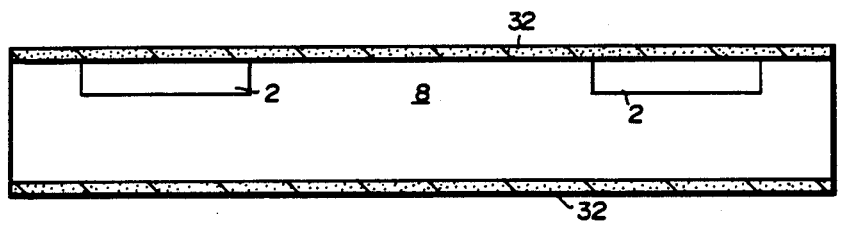

Thereafter, in FIG. 3c the oxide film 30 which was used for boron diffusion masking is removed. A three-layer sandwich structure 32 is then formed on both sides of the silicon substrate consisting of: (a) a thermally grown silicon oxide, (b) a chemical vapor deposited (CVD) silicon nitride and (c) a CVD silicon oxide. As noted above, this sandwich structure provides the advantages of enhanced diaphragm mechanical ruggedness and structural integrity. The sandwich structure also contributes to providing thermal stress relief for the diaphragm structure. In this regard, the silicon oxide has a thermal expansion coefficient which is on the order 1/10th of the thermal expansion coefficient of silicon. Thus, upon the cooling of silicon oxide and silicon, the silicon will attempt to shrink to a greater extent then the silicon oxide. By adding a further layer of silicon nitride (which has a higher thermal expansion coefficient greater than the silicon), the thermal stress forces are balanced and a structure which responds better to temperature changes results. Additionally, the resulting thin dielectric structure provides good electric insulation while thermally isolating the ambient air temperature sensing elements 6 and 7 from the heating element 3. Although not essential for sensor fabrication, the sandwich structure 32 is also disposed on the bottom portion of the sensor and is utilized as masking material.

Figure 3D:
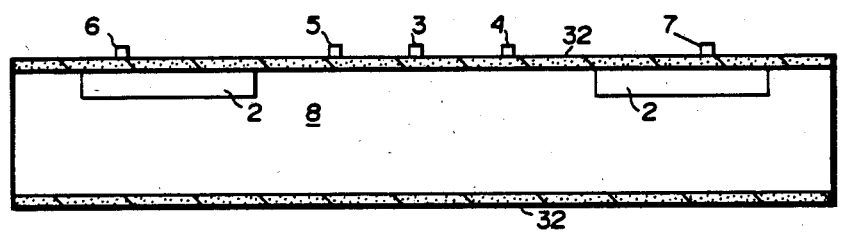
Figure 3E:
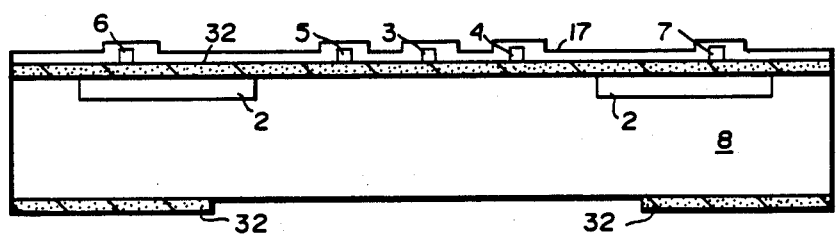

In FIG. 3d, thin-film elements, for example, comprised of chromium and gold are deposited and patterned to define the heating and temperature sensing elements 3 through 7 and the common ground 9 (not shown). The thin-films forming such heating, temperature sensing and ground elements are less than one micron thick. In FIG. 3e, a plasma CVD silicon nitride film 17 is then deposited on top of the substrate to protect the heating and temperature sensing elements from environmental contamination. Pad regions (not shown) for external connections are photolithographically defined concurrently with the deposit of elements 3-7.

As noted above, the sensor of the present invention is formed utilizing silicon micromachining processes which involve the process steps of photolithographic pattern transfer, three-dimensional silicon etching and thin-film deposition. Further details regarding the silicon micromachining techniques utilized to fabricate the diaphragm and the p-etch-stopped rim 2 around the diaphragm may be found in the above-mentioned co-pending related application Ser. No. 07/137,219 entitled "Silicon Based Sensors and Method of Making Same" using p-stop-etching and electrostatic sealing technique.

Figure 3F:
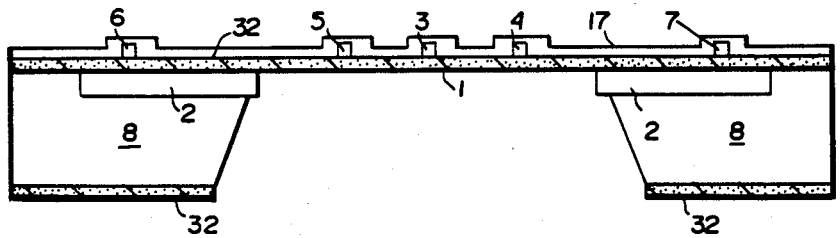

In forming the dielectric diaphragm window 1 shown in FIG. 3f, photolithographic processes are used to set the stage for the silicon etching which defines the dielectric diaphragm window (which are similar to the steps utilized in the formation of the p-etch-stopped silicon rim). In this regard, the backside of the silicon wafer 8 is shown with a masking layer 32 in FIGS. 3e and 3f (or alternatively, another suitable masking material such as silicon oxide and/or silicon nitride) on top of which is added a photoresist coating. The wafer is then exposed to ultraviolet light through the mask which has been imprinted with the desired diaphragm pattern. After developing the photoresist layer that has been exposed, the unprotected portion of the masking layer 32 is removed in order to expose the silicon substrate 8 for etching.

In accordance with the present invention, all the silicon underneath the diaphragm window region is etched away by an anisotropic chemical etchant. In anisotropic chemical etching, the etch rate depends on the silicon's crystallographic orientation. Such selective crystallographic dependent etching also assists in the fabrication of the tapered side formations shown in FIG. 2.

A further significant feature of anisotropic etchant is that the etch rate is dependent on the doping density. In this regard, the etch rate can be reduced by a factor of 50 when the doping density of boron exceeds $7 \times 10^{-19} cm^{-3}$. By virtue of the etchant's crystallographic orientation and doping dependency, the p-etch-stopped silicon rim 2 accurately controls diaphragm thickness.

FIG. 3f shows all the silicon underneath the diaphragm window region being etched away. A preferred anisotropic chemical etching solution utilized to fabricate the mass airflow sensor is an ethylenediamine-based solution.

In order to fabricate the double side tapered edges shown in FIG. 2 (before the final diaphragm etching step on the backside of the wafer shown in FIG. 3f), an additional masking step is required at FIG. 3e to define the scribe lines on the front side and back sides to realize the upper and lower parts of the double tapered edges. In this regard, additional photolithography and dielectric removal steps are necessary. Thus on both edges of the wafer at FIG. 3e the upper and lower sandwich structure 32 and the silicon nitride layer 17 are removed to expose the wafer 8. In this fashion, the front and back sides of the silicon are simultaneously exposed to permit the front and back sides of the wafer to be simultaneously etched to form the tapered edges along with the etching step forming the diaphragm window 1 in FIG. 3f.

As noted above, the tapered edges disturb the airflow path less then the abrupt airflow change which would result from a perpendicularly disposed side edge. Thus, the tapered side edges serve to smooth out the airflow crossing the sensor device. The tapered edges are important to prevent the localizing of turbulence. Instead, the tapered edges contribute towards a more uniformly distributed, predictable turbulence.

The present invention contemplates various modifications and variations of the design shown in FIGS. 1 and 2. For example, the sensor may be built on multiple diaphragm windows rather than on a single diaphragm window. The diaphragm shape may be square, circular or polygonal depending upon desired thermal isolation and power availability considerations. For example, when using a very small diaphragm, a relatively large amount of power is needed to heat the heating elements to the necessary temperature. At the sacrifice of requiring a relatively large amount of operating power, such a diaphragm would be very strong. If the area of the diaphragm is large, then relatively little power is needed to heat the heating elements to required temperature. Such a sensor, however, would be relatively fragile.

A variety of thin-films other than the chromium and gold discussed above may be used for the sensing and heating elements. Acceptable metal films may, for example, include platinum, tantalum and nickel. Thus, the thin-film elements may comprise metals and metal alloys such as Cr/Au, Ti-W/Au, Mo, Ni, Pt, and W. Non-metallic films such as polysilicon or metal silicides are also very good candidates for sensing and heating elements in the sensor described above.

It should further be recognized that depending upon the readout circuitry for flow sensing, various alternative ways of positioning the heating and sensing elements are contemplated by the present invention. For example, a thin-film metal sensor may be placed on top of a polysilicon or silicide heating element. Such a configuration allows perfect thermal coupling between the heater and sensing elements, while still maintaining separate heating and sensing functions. If needed, an electrical contact to the silicon substrate can easily be formed by adding a simple diffusion process to the fabrication process shown in FIG. 3.

The technique discussed in conjunction with FIG. 3 for fabricating the mass airflow sensor of the present invention is fully compatible with techniques used for silicon IC fabrication. In this regard, some of the steps discussed above may be performed at the same time with typical MOS or bipolar IC fabricating steps. Thus, before the metal films 3 through 7 are formed in FIG. 3d, MOS or bipolar devices may be fabricated on the same chip along with the sensor structure. Accordingly, sensor readout electronics, such as disclosed in the Lee et al. copending application, can be fabricated on the same sensor chip with a relatively modest increase in chip size and processing complexity.

Figure 4:
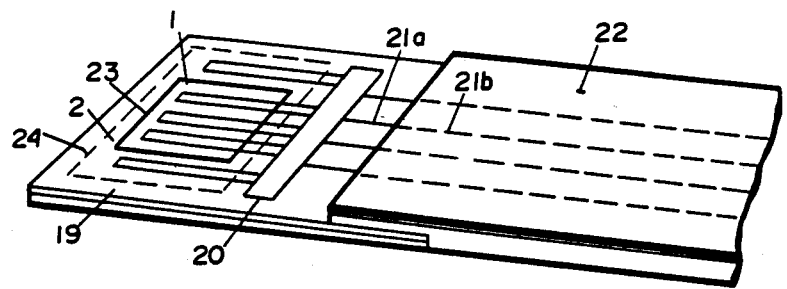
FIG. 4 is a schematic diagram of an airflow sensing system containing on chip readout circuits.

Turning next to FIG. 4, this figure shows an airflow sensing subsystem containing on chip readout circuitry. In this regard, the airflow sensor shown in FIGS. 1 and 2 is schematically represented at 19 in FIG. 4 and the on-chip readout circuit is shown at 20. The on-chip readout circuit 20 is connected to an external microprocessor control circuit and power supply (not shown) via electrical connections 21a.

Between the dashed-line rectangle 24 and the solid rectangle 23 lies the p-etch-stopped region 2. Within the rectangle 23 lies the diaphragm window. The sensor chip is supported by a ceramic substrate 22 which contains the electrical connections 21b. The entire subsystem is then disposed in the appropriate air channel.

The configuration of FIG. 4 contemplates that solder bumping or tape-automated bonding may be utilized for directly connecting the electrical connectors 21b in the ceramic substrate with the electrical connectors 21a on the chip. Thus, wire-type bonding is not necessary in this system although any bonding method is applicable to the present invention. This overall configuration has many advantages over prior art mass airflow sensors, including enhanced noise immunity, reduced overall packaging costs and improved manufacturing yield.

While the invention has been described in connection with what is presently considered to be in the most practical and preferred embodiment, it is to be understood that the invention is not to be limited to the disclosed embodiment but on the contrary, it is intended to cover various applications and equivalent arrangements included with the spirit and scope of the appended claims.

We claim:

1. A mass airflow sensor having a longitudinal axis comprising:
    a dielectric diaphragm;
    a thin-film heating element disposed on said diaphragm;
    a thermally conductive semiconductor rim comprising a heavily doped etch stopped region encompassing at least a major portion of said dielectric diaphragm; and
    at least one thin-film sensing element disposed on said diaphragm, said at least one sensing element being disposed at least in part over said semiconductor rim, whereby the temperature gradient between the heating element and said at least one sensing element may be monitored to determine the airflow rate, said heating element being centrally disposed substantially along the longitudinal axis of the sensor and a plurality of sensing elements disposed on both sides of said heating element.

2. A sensor according to claim 1, wherein said dielectric diaphragm comprises a sandwich structure of dielectric materials having substantially different coefficients of thermal expansion.

3. A sensor according to claim 1, wherein the mass airflow sensor is fabricated from a semiconductor substrate and wherein the semiconductor substrate below the dielectric diaphragm is removed.

4. A sensor according to claim 3, wherein a semiconductor substrate region is disposed below the semiconductor rim.

5. A sensor according to claim 1, further including at least one thin-film sensing element disposed between said heating element and said semiconductor rim.

6. A sensor according to claim 1, wherein each of said heating element and said sensing element are substantially parallel with respect to each other.

7. A sensor according to claim 1, wherein the diaphragm dimensions are determined by the semiconductor rim.

8. A sensor according to claim 1, wherein said sensor is fabricated on a semiconductor substrate and further includes:
    read-out and control means fabricated on said semiconductor substrate for energizing said heating element and receiving signals from said at least one sensing element.

9. A sensor according to claim 1, wherein said sensor is fabricated on a semiconductor substrate and said heating element is disposed on a front surface of said substrate and wherein at least one side of the substrate is tapered.

10. A sensor according to claim 9, wherein said at least one side includes a double-side tapered edge.

11. A sensor according to claim 8, wherein said readout and control means has a plurality of output lines emanating therefrom, and further including a support substrate having a like plurality of electrical lines for respectively contacting each of said plurality of output lines, to thereby provide electrical connection to external control and power supply circuitry.

12. A mass airflow sensor comprising:
    a dielectric diaphragm;
    a thin-film heating element disposed on said diaphragm;
    a thermally conductive semiconductor rim encompassing at least a major portion of said dielectric diaphragm and comprised of p-etch-stopped silicon; and
    at least one thin-film sensing element disposed on said diaphragm, the diaphragm dimensions being determined by the semiconductor rim.

13. A sensor according to claim 12, wherein said dielectric diaphragm comprises a sandwich structure of dielectric materials having substantially different coefficients of thermal expansion.

14. A sensor according to claim 13, wherein said sandwich structure comprises silicon dioxide and silicon nitride.

15. A sensor according to claim 12, wherein said at least one sensing element is disposed at least in part over said semiconductor rim, whereby the temperature gradient between the heating element and said at least one sensing element may be monitored to determine the airflow rate.

16. A sensor according to claim 12, wherein the mass airflow sensor is fabricated from a semiconductor substrate and wherein the semiconductor substrate below the dielectric diaphragm is removed.

17. A sensor according to claim 16, wherein a semiconductor substrate region is disposed below the semiconductor rim.

18. A sensor according to claim 12, further including at least one thin-film sensing element disposed between said heating element and said semiconductor rim.

19. A sensor according to claim 12 having a longitudinal axis, wherein said heating element is centrally disposed substantially along the longitudinal axis of the sensor and wherein a plurality of sensing elements are disposed on both sides of said heating element.

20. A sensor according to claim 19, wherein each of said heating element and said sensing element are substantially parallel with respect to each other.

21. A sensor according to claim 12, wherein said sensor is fabricated on a semiconductor substrate and further includes:
read-out and control means fabricated on said semiconductor substrate for energizing said heating element and receiving signals from said at least one sensing element.

22. A sensor according to claim 12, wherein said sensor is fabricated on a semiconductor substrate and said heating element is disposed on a front surface of said substrate and wherein at least one side of the substrate is tapered.

23. A sensor according to claim 22, wherein said at least one side includes a double-side tapered edge.

24. A sensor according to claim 21, wherein said read-out and control means has a plurality of output lines emanating therefrom, and further including a support substrate having a like plurality of electrical lines for respectively contacting each of said plurality of output lines, to thereby provide electrical connection to external control and power supply circuitry.

25. A mass airflow sensor fabricated on a semiconductor substrate comprising:
a dielectric diaphragm;
a heating element and at least one temperature sensing element disposed on said diaphragm;
a semiconductor region disposed adjacent said diaphragm;
at least one temperature sensing element disposed over said semiconductor region, whereby an airflow therepast may be determined based on the temperature gradient between the heating element and said at least one temperature sensing element disposed over said semiconductor region, said semiconductor region comprising a heavily doped etch stopped region which surrounds said dielectric diaphragm.

26. A sensor according to claim 25, wherein said heating element and said at least one sensing elements are thin-film components.

27. A sensor according to claim 25, wherein said dielectric diaphragm comprises a sandwich structure of dielectric materials having substantially different coefficients of thermal expansion.

28. A sensor according to claim 25, wherein the semiconductor substrate below the dielectric diaphragm has been removed.

29. A sensor according to claim 25, further including at least one thin-film sensing element disposed between said heating element and said semiconductor region.

30. A sensor according to claim 25 having a longitudinal axis, wherein said heating element is centrally disposed substantially along the longitudinal axis of the sensor and wherein a plurality of sensing elements are disposed on both sides of said heating element.

31. A sensor according to claim 25, further including read-out and control means fabricated on said semiconductor substrate for energizing said heating element and receiving signals from said at least one temperature sensing element.

32. A sensor according to claim 25, wherein said heating element is disposed on a front surface of said substrate and wherein at least one side of the substrate is tapered.

33. A sensor according to claim 32, wherein said at least one side includes a double-side tapered edge.

34. A sensor according to claim 31, wherein said read-out and control means has a plurality of output lines emanating therefrom and further including a support substrate having a like plurality of electrical lines for respectively contacting each of said plurality of output lines, to thereby provide electrical connection to external control and power supply circuitry.

35. A mass airflow sensor having a longitudinal axis comprising:
a dielectric diaphragm;
a thin-film heating element disposed on said diaphragm;
a thermally conductive semiconductor rim encompassing at least a major portion of said dielectric diaphragm;
at least one thin-film sensing element disposed on said diaphragm, said at least one sensing element being disposed at least in part over said semiconductor rim, whereby the temperature gradient between the heating element and said at least one sensing element may be monitored to determine the airflow rate, said heating element being centrally disposed substantially along the longitudinal axis of the sensor and a plurality of sensing elements disposed on both sides of said heating element; and
said dielectric diaphragm having a sandwich structure of dielectric materials having substantially different coefficients of thermal expansion, said sandwich structure being comprised of silicon dioxide and silicon nitride.

36. A sensor according to claim 35, wherein the mass airflow sensor is fabricated from a semiconductor substrate and wherein the semiconductor substrate below the dielectric diaphragm is removed.

37. A sensor according to claim 35, wherein a semiconductor substrate region is disposed below the semiconductor rim.

38. A sensor according to claim 35, wherein each of said heating element and said sensing elements are substantially parallel with respect to each other.

39. A sensor according to claim 35, wherein the diaphragm dimensions are determined by the semiconductor rim.

40. A sensor according to claim 35, wherein said sensor is fabricated on a semiconductor substrate and further includes:
read-out and control means fabricated on said semiconductor substrate for energizing said heating element and receiving signals from said at least one sensing element.

41. A sensor according to claim 35, wherein said sensor is fabricated on a semiconductor substrate and said heating element is disposed on a front surface of said substrate and wherein at least one side of the substrate is tapered.

42. A sensor according to claim 41, wherein said at least one side includes a double-side tapered edge.

43. A sensor according to claim 35, wherein said sensor is fabricated on a semiconductor substrate and further includes:
read-out and control means fabricated on said semiconductor substrate for energizing said heating element and receiving signals from said at least one sensing element, said read-out and control means having a plurality of output lines emanating therefrom, and further including a support substrate having a like plurality of electrical lines for respectively contacting each of said plurality of output lines, to thereby provide electrical connection to external control and power supply circuitry.

* * * * *